United States Patent Office 3,472,614
Patented Oct. 14, 1969

3,472,614
METHOD OF CONTROLLING THE MICROSTRUC-
TURE OF A TITANATE CERAMIC
Don B. Jugle, Penfield, N.Y., assignor, by mesne assign-
ments, to the United States of America as represented
by the Secretary of the Navy
No Drawing. Filed Mar. 6, 1967, Ser. No. 621,403
Int. Cl. C01g 23/00
U.S. Cl. 23—51                                  15 Claims

ABSTRACT OF THE DISCLOSURE

The number of (111) spinel twins in chemically pure BaTiO$_3$ is varied by hot pressing the BaTiO$_3$ in graphite having a grain size on the order of 0.5 micron. The propensity to form (111) twins is found to be dependent upon the Ti$^{3+}$ concentration, and the number of (111) spinel twins formed is found to be a manifestation of the number of stacking faults occurring in the material. A decreasing aging rate is achieved as the number of twinned grains increases.

---

The invention described herein may be manufactured and used by or for the Government of the United States of America for governmental purposes without the payment of any royalties thereon or thereafter.

This invention relates to the production of high density barium titanate and more particularly to the production of dense barium titanate ceramics from pure barium titanate.

One of the major problems in the manufacture of pure barium titanate ceramic bodies is the achievement of high density. At about 1,250° centigrade exaggerated grain growth occurs which growth is normally attacked either (1) by adding another component to act as a flux to produce a liquid phase at a temperature lower than the melting point of barium titanate, liquid phase serving as a binder and tending to prevent growth of large grains, (2) by adding a further component which acts as a grain growth inhibitor without the formation of a liquid phase, and (3) by hot pressing with or without the formation of a liquid phase.

The first two modes of attack contaminate the pure barium titanate; and the third, beside limiting the size of bodies that can be made also often involves a reducing atmosphere which is equivalent to contamination.

The present invention is primarily directed to control of the microstructure which is attained by hot pressing chemically pure barium titanate in a reducing atmosphere of graphite followed by subsequent grain growth heat treatments under varying atmosphere conditions. These heat treatments vary the concentration of the Ti$^{3+}$ ions which arise from the reduction of the Ti$^{4+}$ ions in stoichiometric BaTiO$_3$. A significant feature is that the (111) spinel twin occurs in varied numbers and form. The (111) twin results during the grain growth stages of a sintering process with the propensity to twin being related to the concentration of Ti$^{3+}$ ions in the structure.

Accordingly, it is an object of the present invention to provide high density titanate ceramic through a series of heat treatments which result in a variation of the number of grains containing the (111) spinel twin.

Another object of the invention is to provide a method of and means for obtaining a high density barium titanate ceramic for a high concentration of (111) twins at an aging rate which is less temperature dependent than a structure having a lower concentration of (111) twins.

A further object of the invention is to provide a method of reducing the aging rate of barium titanate such that the aging rate, as measured by the percent decrease in capacitance per decade of time, decreases with increasing twin concentrations.

Other objects, advantages and novel features of the invention will become apparent from the following detailed description thereof.

Several questions remain to be answered in regard to the parameters contributing to the phenomenon of aging. The role of the stacking fault lattice defect accompanying the commonly observed (111) twin in BaTiO$_3$ ceramics has been investigated to determine how this (111) twin originates and whether the defect structure resulting in this (111) spinel type twin affects the dielectric aging and other ferroelectric characteristics of this ceramic. With knowledge of the origin of the (111) twinning, a series of microstructures can be developed through the use of varying concentrations of twins.

Experiments have shown that hot pressing chemically pure barium titanate in graphite produces highly dense structures with an excess number of (111) twins. In addition, under proper conditions a high density material can be produced with a range of grain sizes from 0.5 to greater than 50 microns. On the basis of these observations, changes in the parameters which might affect the genesis of the (111) twin, i.e., pressing pressure, pressing temperature, and chemical changes caused by reducing or oxidizing conditions have been investigated.

A set of standard specimens of chemically pure barium titanate for comparison was prepared by conventional cold pressing and sintering techniques. The steps used are presented in Table I.

TABLE I

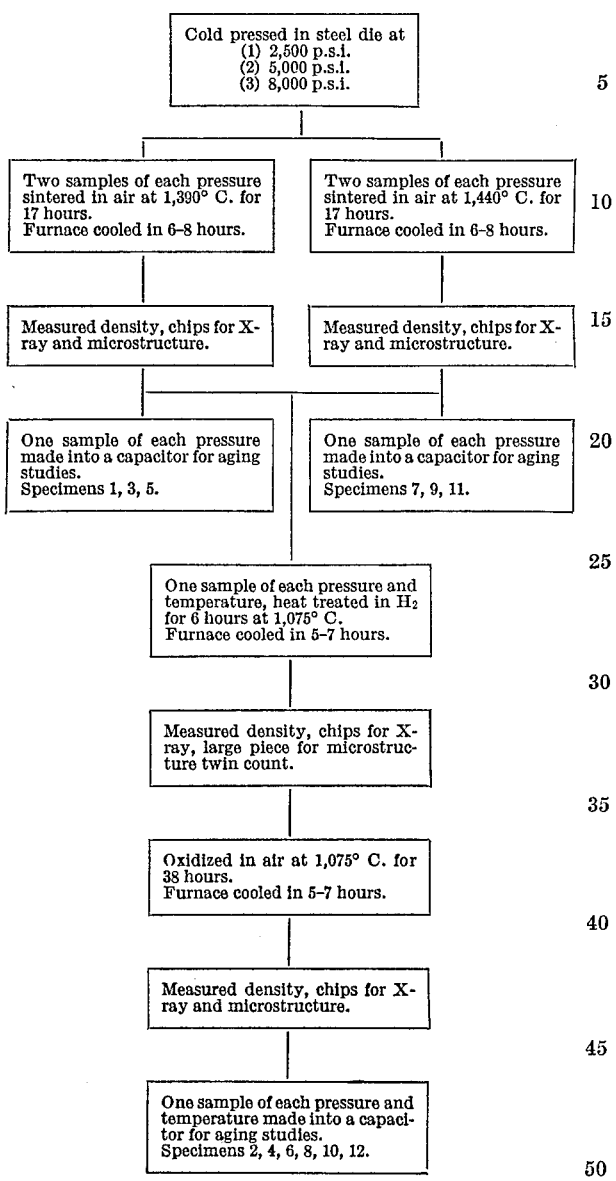

After the specimens were removed from the steel die, they were thoroughly brushed to remove the contaminated layer resulting from die abrasion. The specimens were fired in an electrically heated platinum-40% rhodium wire wound high purity $Al_2O_3$ (Morganite) tube furnace. They were placed on barium titanate chips which rested on a piece of zirconia ($ZrO_2$). The density of the samples was determined by the Archimedean technique using carbon tetrachloride as the displaced fluid. The chips used for ceramography and X-ray analysis were obtained from an extra disk which was treated along with the final specimens. This procedure resulted in twelve specimens.

Since it is believed that the twinning phenomena is best studied by hot pressing to a fine grain size (on the order of one micron) with subsequent heat treatments under controlled conditions, hot pressing was done by two techniques; (1) hot pressing in a $ZrO_2$ (zirconia) die with heating accomplished by a platinum-40% rhodium resistance wire wound $Al_2O_3$ tube furnace, (2) hot pressing in high purity graphite with heating accomplished by a Kanthal wire wound $Al_2O_3$ tube furnace. For case (1), $ZrO_2$ was used for the die, plungers, and spacers and $Al_2O_3$ was used for the extensions. The graphite die, case (2) utilized a split die-liner for ease of specimen removal whereas the $ZrO_2$ die was solid. The specimens were pre-pressed in a steel die. The procedure for hot pressing in $ZrO_2$ is presented in Table II while that for hot pressing in graphite is presented in Table III(a) and Table III(b). A summary of data showing the temperature dependence of aging rate for various twin concentrations is presented in Table IV.

TABLE II

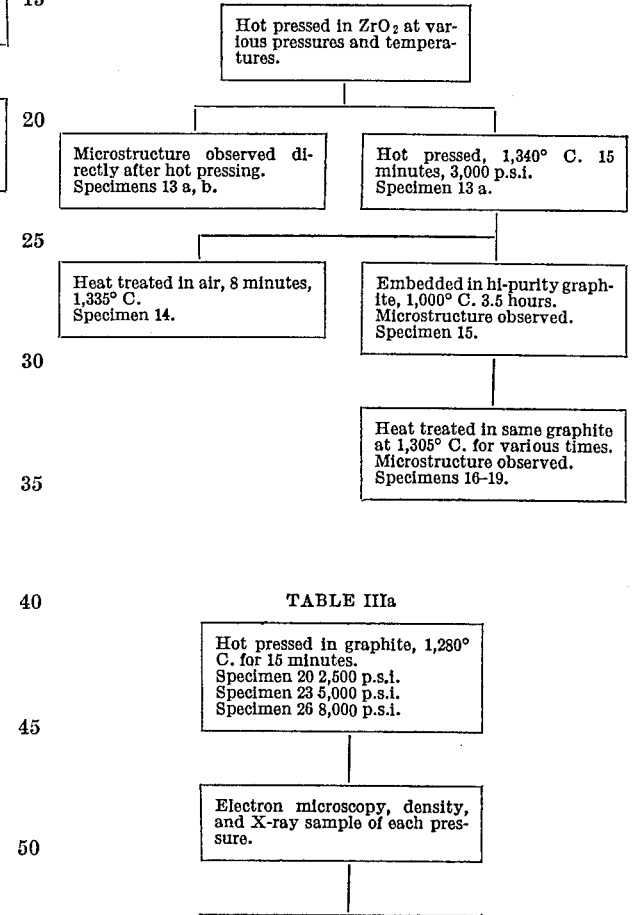

TABLE IIIa

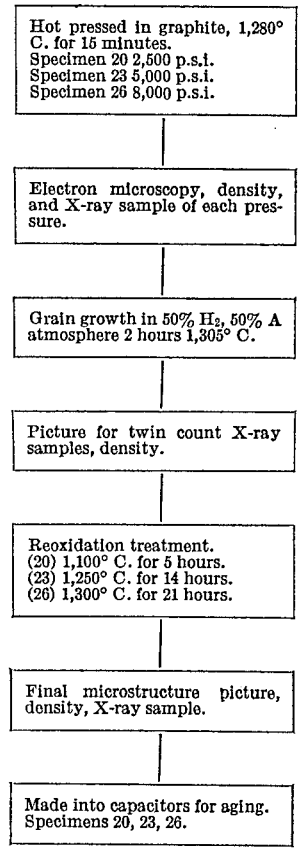

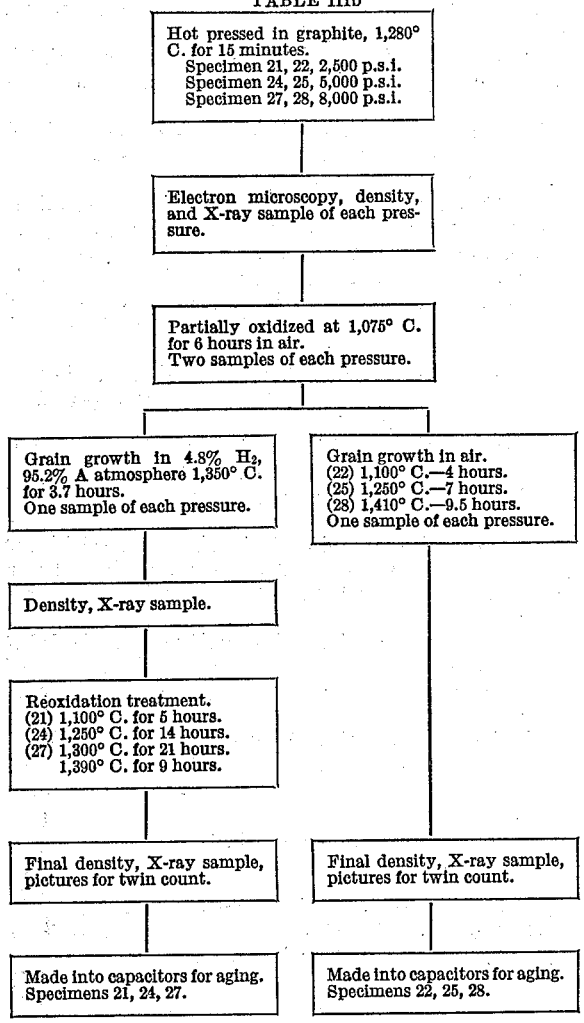

0.5. Hot pressing in the reducing atmosphere of a graphite die at 1,340° C. produced a two phase material consisting of hexagonal $BaTiO_{3-x}$ (the $O_{3-x}$ indicates that the specimen is in the reduced state, i.e., its color is blue-black).

By comparing specimens it was found that the state of reduction (or oxidation) of the titanium ion has a marked affect on the propensity to twin, when the material is allowed to undergo grain growth in a controlled atmosphere. Grain growth under reducing conditions results in a highly twinned structure with both coherent and incoherent interfaces. If, on the other hand, the same material is oxidized to varying degrees and then allowed to undergo grain growth a lower yield occurs. The rate of grain growth diminished greatly after 30 minutes and thereafter intervals up to 8 hours produced little increase.

The (111) twinning phenomena has been found to result during grain growth and to be more probable when the material is in the reduced state, i.e., when there are oxygen vacancies with the associated F center electrons and $Ti^{3+}$ ions.

Data shows a correlation between (111) twinning and electrical properties. By way of explanation, the twin may arise from a single stable stacking fault which occurs during grain growth. It is reasonable to consider each portion of a twinned crystal as consisting of a great number of stacking faults which occur very close to one another so that their effects are eradicated and no macroscopic twin exists. Thus, the manifestation of the twin is an indication of the materials' propensity to form stacking faults during grain growth. That is, in a large number of twinned grains there may also be additional defect structures beyond those revealing themselves as macroscopic twins.

A curious effect significantly reducing aging has been observed at low twin concentrations, i.e., a great increase in aging rate is observed for the lowest of the twin concentrations. In one instance, a specimen was heat treated in such a way as to obtain an intermediate number of twins, however, only approximately 0.1 of the grains were twinned. Possibly, the heat treatments may have caused a great number of stacking faults in the material without being sufficient to cause observable twinning.

TABLE IV

| Specimen No. | Heat treatment (Table III) | Fraction of twin grains | Aging rates (percent decrease per decade of time) | | |
|---|---|---|---|---|---|
| | | | 30° C. | 60° C. | 90° C. |
| 20 | High | 0.548 | 1.53 | 2.02 | 2.69 |
| 23 | High | 0.637 | 2.41 | 2.60 | 2.99 |
| 26 | High | 0.608 | 1.76 | 2.59 | 3.06 |
| Average | | 0.597 | 1.90 | 2.40 | 2.75 |
| 21 | Medium | 0.180 | 3.14 | 4.02 | 5.28 |
| 24 | Medium | 0.097 | 2.32 | 3.59 | 4.67 |
| 27 | Medium | 0.074 | 2.80 | 4.23 | 5.94 |
| Average | | 0.117 | 2.75 | 3.98 | 5.30 |
| 22 | Low | 0.157 | 3.25 | 5.21 | 5.03 |
| 25 | Low | 0.071 | 3.78 | 5.08 | 5.25 |
| 28 | Low | 0.069 | 2.82 | 5.09 | 5.84 |
| Average | | 0.099 | 3.28 | 5.13 | 5.37 |

The values necessary for calculating the fraction of twinned grains were computed via the Fortran IV program. This program calculates the fraction of twinned grains and the grain size for each of six photographs of a specimen. The fraction and the grain size are determined by two techniques, lineal and areal analysis, and an average taken of the twelve values. The normally treated specimens were found to have about 0.1 of the grains, whereas the other specimens which received special heat treatments vary between 0.1 and 0.88.

It has been determined that the temperature dependence of grain growth occurring during hot pressing is extremely dependent upon the state of reduction in the $BaTiO_3$. Hot pressing in air at 1,340° C. in $ZrO_2$ produced a fine grained structure with a grain size of approximately In any case, there appears to be an interaction between capacitance aging and (111) twins. In other words, aging is an extrinsic effect that can be controlled by controlling the microstructure.

In summary, it has been found that control of the micro-structure can be attained by hot pressing chemically pure $BaTiO_3$ in graphite (a reducing atmosphere) followed by subsequent grain growth heat treatments under varying atmosphere conditions. The effect of these heat treatments is believed to be to vary the concentration of the $Ti^{3+}$ ions which arise from the reduction of the $Ti^{4+}$ ions in stoichiometric $BaTiO_3$. The microstructural feature which occurs in varied numbers and form is the concentration (111) spinel twin.

Obviously many modifications and variations of the

What is claimed is:

1. The method of preparing a fine-grain polycrystalline aggregate of a titanate composition characterized by increased twin concentrations comprising the steps of:

hot pressing pure barium titanate in high purity graphite at a temperature of about 1,280° C. for about 15 minutes under a pressure of from about 2,500 p.s.i. to about 8,000 p.s.i.;

sintering the material in an atmosphere of from about 50% $H_2$ and 50% A for about 2 hours at a temperature of about 1,305° C.; and reoxidizing the material at a temperature of from about 1,100° C. for a period of from about 5 hours to about 20 hours.

2. The method of claim 1 wherein the material is hot pressed under a pressure of about 2,500 p.s.i. and reoxidized at a temperature of about 1,100° C. for a period of about 5 hours.

3. The method of claim 1 wherein the material is hot pressed under a pressure of about 5,000 p.s.i. and reoxidized at a temperature of about 1,250° C. for a period of about 14 hours.

4. The method of claim 1 wherein the material is hot pressed under a pressure of about 8,000 p.s.i. and reoxidized at a temperature of about 1,300° C. for a period of about 21 hours.

5. The method of preparing a fine-grain polycrystalline aggregate of a titanate composition characterized by increased twin concentrations comprising the steps of:

hot pressing pure barium titanate in high purity graphite at a temperature of about 1,280° C. for about 15 minutes under a pressure of from about 2,500 p.s.i. to about 8,000 p.s.i.;

partially oxidizing the material in an air atmosphere at a temperature of about 1,075° C. for a period of about 6 hours;

sintering the material in an atmosphere of from 4.8% $H_2$ and 95.2% A for about 3.7 hours at a temperature of about 1,350° C.; and reoxidizing the material at a temperature of from about 1,100° C. to about 1,390° C. for a period of from about 5 hours to 21 hours.

6. The method of claim 5 wherein the material is hot pressed under a pressure of about 2,500 p.s.i. and reoxidized at a temperature of about 1,100° C. for a period of about 5 hours.

7. The method of claim 5 wherein the material is hot pressed under a pressure of about 5,000 p.s.i. and reoxidified at a temperature of about 1,250° C. for a period of about 14 hours.

8. The method of claim 5 wherein the material is hot pressed under a pressure of about 8,000 p.s.i. and reoxidized at a temperature of about 1,300° C. for a period of about 21 hours.

9. The method of claim 6 wherein the material is reoxidized for an additional period of about 9 hours at a temperature of about 1,390° C.

10. The method of claim 7 wherein the material is reoxidized for an additional period of about 9 hours at a temperature of about 1,390° C.

11. The method of claim 8 wherein the material is reoxidized for an additional period of about 9 hours at a temperature of about 1,390° C.

12. The method of preparing a fine-grain polycrystalline aggregate of a titanate composition characterized by increased twin concentrations comprising the steps of:

hot pressing pure barium titanate in high purity graphite at a temperature of about 1,280° C. for about 15 minutes under a pressure of from about 2,500 p.s.i. to about 8,000 p.s.i.;

partially oxidizing the material in an air atmosphere at a temperature of about 1,075° C. for a period of about 6 hours; and sintering the material in an air atmosphere at a temperature of from about 1,100° C. to about 1,410° C. for a period of from about 4 hours to about 9.5 hours.

13. The method of claim 12 wherein the material is hot pressed under a pressure of 2,500 p.s.i. and sintered at a temperature of about 1,100° C. for a period of about 4 hours.

14. The method of claim 12 wherein the material is hot pressed under a pressure of about 5,000 p.s.i. and sintered for a period of about 7 hours at a temperature of about 1,250° C.

15. The method of claim 12 wherein the material is hot pressed under a pressure of about 8,000 p.s.i. and sintered at a temperature of 1,410° C. for a period of about 9.5 hours.

References Cited

UNITED STATES PATENTS

| | | | |
|---|---|---|---|
| 2,966,420 | 12/1960 | Prokopowicz et al. | 106—39 |
| 2,972,176 | 2/1961 | Grauley | 106—39 X |
| 2,990,602 | 7/1961 | Brandmays et al. | |
| 2,992,079 | 7/1961 | Linares et al. | 23—51 X |
| 3,409,412 | 11/1968 | Sasaki | 23—51 X |

OTHER REFERENCES

DeVries, "Journal of The American Ceramic Soc.," vol. 43, April 1960, p. 226.

Kay et al., "Nature," vol. 160, July 26, 1947, pp. 126–127.

Rosenthal et al., "Ceramic Bulletin," vol. 37, No. 8, 1958, pp. 370–375.

HERBERT T. CARTER, Primary Examiner

U.S. Cl. X.R.

106—39